Jan. 19, 1926. 1,570,499
J. F. KEANE
RADIO BATTERY CHARGING SWITCH MEANS
Filed Feb. 28, 1924 2 Sheets-Sheet 1
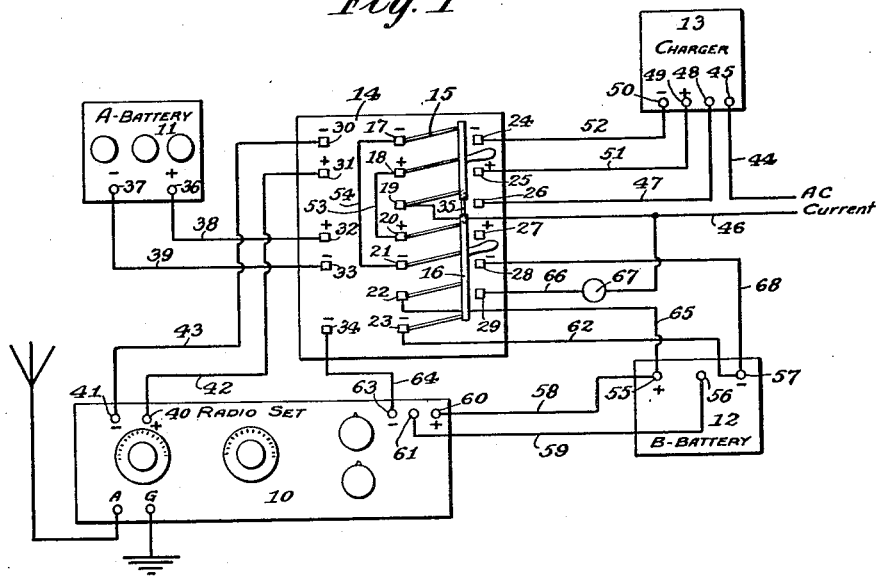
Inventor
John F. Keane
By Chamberlain & Newman
Attorneys Jan. 19, 1926.  1,570,499
J. F. KEANE
RADIO BATTERY CHARGING SWITCH MEANS
Filed Feb. 28, 1924   2 Sheets-Sheet 2

B. BATTERY CHARGING.

A. BATTERY CHARGING

RADIO SET OPERATING

Inventor
John F. Keane
By Chamberlain & Newman
Attorneys

Patented Jan. 19, 1926.

1,570,499

UNITED STATES PATENT OFFICE.

JOHN F. KEANE, OF BRIDGEPORT, CONNECTICUT.

RADIO-BATTERY-CHARGING SWITCH MEANS.

Applicaton filed February 28, 1924. Serial No. 695,692.

*To all whom it may concern:*

Be it known that JOHN F. KEANE, a citizen of the United States, and resident of Bridgeport, in the county of Fairfield and State of Connecticut, has invented certain new and useful Improvements in Radio-Battery-Charging Switch Means, of which the following is a specification.

This invention relates to a battery charging switch means, particularly for radio use, and has for its object to provide a control switch permanently connecting a radio set, storage "A" and "B" batteries, and a charger, to the end that, through manipulation of the switch, either of the batteries may be charged, as desired, or the set may be operatively connected. Heretofore it has been the practice to connect the battery to the charger, at the same time disconnecting the set, which was inconvenient, time-consuming, and open to the danger of making wrong connections which might result in damage to the set.

According to the present invention it is proposed to provide a central control switch, to which the batteries, set and charger are connected, and by means of which the batteries may be individually connected to the charger in the proper electrical relation, the set being automatically disconnected, and by means of which the set may be electrically connected to the batteries, and the charger automatically disconnected.

A further object is to provide a switch means which will safeguard against improper connections of the set or charger to the batteries, which might cause the tubes to be blown out, or the set grounded when charging.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a diagrammatic plan of a switch means, according to the present embodiment of the invention, and showing the set, batteries, and charger, and the connecting leads between them;

Fig. 2 is a diagrammatic plan of a modified arrangement, in which the charger includes separate "A" and "B" battery charging units;

Figure 3:
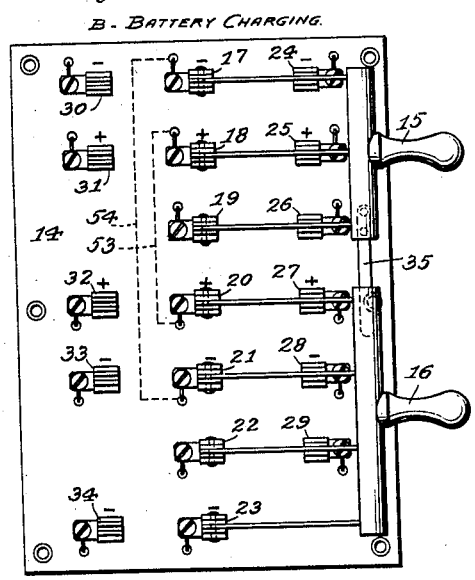
Fig. 3 is a plan view of the switch, showing the same in position for charging the "B" battery.

Referring to Fig. 1, the several main elements of the apparatus are illustrated diagrammatically therein, as follows:—the radio set 10, the "A" battery 11, the "B" battery 12, the charger 13, and the switch control panel 14. The switch is of the knife blade type, and is provided with two levers 15 and 16, the upper lever having three blades and the lower four blades, said levers being pivoted at the inner ends of the blades to posts 17, 18, 19, 20, 21, 22 and 23 secured to the panel along the center line thereof.

Figure 5:
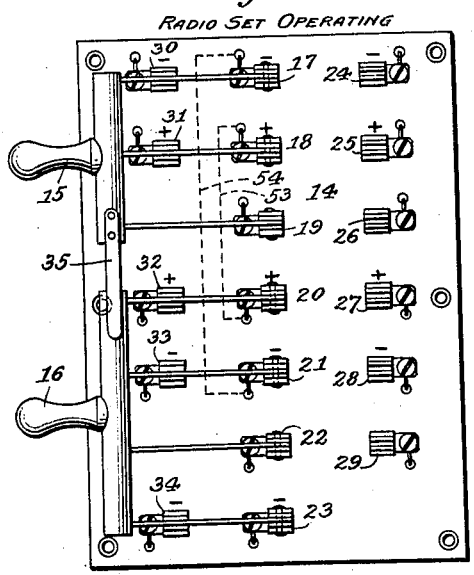
Fig. 5 is another similar view of the switch, and showing the same in position for operating the set.
Figure 6:
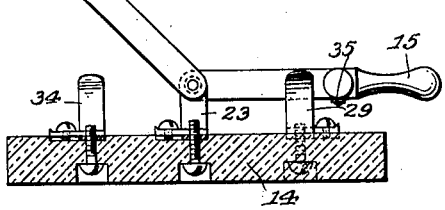
Fig. 6 is a sectional view of the switch, taken along the line 6—6 of Fig. 4.

Adjacent one edge of the panel there are provided split resilient posts 24, 25, 26, 27, 28 and 29 adapted to be engaged by the blades of the levers, with the exception of the lowermost blade of the lower lever, in the thrown position thereof, as shown in Fig. 3, and adjacent the other edge there are provided pairs of similar posts 30, 31 and 32, 33 in line with the two upper blades of each lever, and a post 34 in line with the lowermost blade of the lever 16, and adapted to be engaged by these blades in the thrown position of the levers, as shown in Fig. 5. The upper lever has an arm 35 secured to its insulated handle portion and extending under the insulated handle portion of the lower lever in the Fig. 3 position, so that the upper switch cannot be thrown to the Fig. 5 position without also carrying with it the lower lever. This is for the purpose of preventing any possibility of blowing out the tubes of the set, and also preventing a ground through the charging circuit, as will hereinafter more fully appear.

The plus and minus poles 36 and 37 of the "A" battery are connected by leads 38 and 39 to the switch posts 32 and 33, while the plus and minus "A" battery binding posts 40 and 41 of the set 10 are connected to the switch posts 31 and 30 by leads 42 and 43.

The incoming A. C. current is carried by a lead 44 to the post 45 of the charger 13 and a lead 46 to the switch post 19, the circuit being completed by a lead 47 extending from the post 48 of the charger to the switch post 26. The plus and minus posts 49 and 50 of the charger are connected by leads 51 and 52 to the switch posts 25 and 24, the circuit being completed by leads 53 and 54 connecting the plus and minus switch posts 18 and 20 and 17 and 21, respectively.

Figure 4:
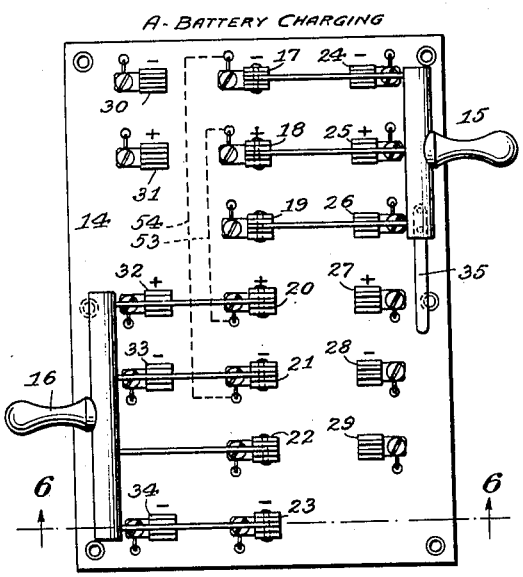
Fig. 4 is a similar view of the switch, and showing the same in position for charging the "A" battery.

This completes the circuits from the "A" battery to the set and from the charger to the "A" battery, Fig. 5 illustrating the position of the switch when the "A" battery is connected to the set and the charger disconnected, and Fig. 4 illustrating the position when the set is disconnected and the charger is connected to the "A" battery. In the first case the current from the "A" battery passes through the leads 38 and 39 to the switch posts 32 and 33, through the switch blades to the posts 20 and 21, through the leads 53 and 54 to the posts 18 and 17, through the upper switch blades to the posts 31 and 30, and through the leads 42 and 43 to the set, the charger being disconnected. In the other case the low voltage current from the charger passes through the leads 51 and 52 to the switch posts 25 and 24, through the upper switch blades to the posts 18 and 17, through the leads 53 and 54 to the posts 20 and 21, through the lower switch blades to the posts 32 and 33, and through the leads 38 and 39 to the battery, the set being disconnected.

The "B" battery 12 is provided with three posts 55, 56 and 57, the posts 55 and 56 being connected by leads 58 and 59 to the "B" battery binding posts 60 and 61 of the radio set, while the post 57 is connected by a lead 62 to the switch post 23, the circuit being completed, when the lower switch lever 16 is thrown to the left, through the lowermost blade thereof and the switch post 34, which is connected to the minus post 63 of the set by a lead 64. When charging the "B" battery the set is disconnected by reason of switch lever being thrown to the right, that is, when the same is in the "B" battery charging position. The plus post 55 is connected by a lead 65 to the switch post 22, the opposite switch post 29 being connected by a lead 66 to the A. C. current lead 46, a suitable resistance, as a lamp 67, being provided in the lead 66. The minus post 57 of the "B" battery is connected by a lead 68 to the switch post 28.

In order to charge the "B" battery the switch levers are thrown to the position shown in Fig. 3, the "A" battery and the "B" battery minus lead to the set being thereby disconnected, and the "B" battery connected to the charger in a manner to receive a charging current of different characteristics from that used when charging the "A" battery, that is, a high voltage as distinguished from a low voltage current. The A. C. current is carried by the lead 66 through the resistance 67 to the switch post 29, through the switch blade to the post 22, and through the lead 65 to the plus post 55 of the "B" battery; the circuit being completed to the charger through the lead 52 from the minus post 50 of the charger to the switch post 24, through the upper switch blade to the post 17, through the lead 54 to the post 21, through the switch blade to the post 28, and through the lead 68 to the minus post 57 of the battery. The lead 51 from the plus post 49 of the charger, it will be noted, is dead-ended at the post 27.

Upon throwing the upper switch lever from the "B" battery charging position (Fig. 3) to the set operating position (Fig. 5), the lower switch lever is automatically carried with it by means of the arm 35, and the proper electrical connection of the set to both the "A" and "B" batteries is made. This arrangement disconnects "B" battery charging wire, preventing any possibility of grounding the set through charging circuit, which might occur if the upper switch lever were thrown to the left, while the lower one remained at the right.

In Fig. 2 there is shown a modified arrangement in which the "A" and "B" batteries are charged from the same leads 51 and 52 of the charger, which is preferably of the type having separate "A" and "B" battery charging units, effected by selectively inserting a fuse in respective clips provided for both batteries. In this modification the leads 65 and 66 to the A. C. current lead 46, as shown in the first form, are dispensed with, and a lead 69 is connected between the switch post 27 and the plus post 55 of the battery, so that the current is carried directly from the charger leads 51 and 52 through the switch to the posts 55 and 57 of the "B" battery. The wiring is otherwise the same as in the first form. With this arrangement it would be possible to blow out the tubes of the set, by putting the high voltage "B" battery current through them, in the event that the upper switch lever 15 were thrown to the left, while the lower switch lever 16 remained at the right. According to the invention, however, this is prevented by the arm 35, which necessarily carries the lower switch lever to the left as the upper switch lever is thrown, thereby obviating any such danger, and insuring the correct connection of the set.

The arm 35 represents a simple and desirable means of at times connecting the two switch levers in a way to insure the movement of the lower switch lever to the left as the upper switch lever is thrown in like manner, but it will be obvious of course that this may be accomplished equally as well by other and perhaps simpler means and yet be within the scope of my invention and therefore I do not wish to be limited in this particular.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. The combination with a radio set, storage "A" and "B" batteries, and a charger, of switch means, leads connecting said set, said batteries and said charger to said switch means, a switch member carried by said switch means adapted in one operative position to contact with the set leads and in another operative position to contact with the charger leads, a charger control switch member carried by said switch means adapted in one operative position to contact with the "A" battery leads and in another operative position to contact with the "B" battery leads whereby only one of said batteries may be charged at a time, and electrical connections between said switch members whereby individual connections may be made in various positions of said switch members between said set and "A" battery, said "A" battery and charger, and said "B" battery and charger, an operative connection between said switch members adapted to permit movement of said second switch member to either of its operative positions in the position of said first switch member in contact with said charger leads, to prevent movement of said first switch member from its position in contact with said charger leads in the position of said second switch member in contact with said "B" battery leads.

2. The combination with a radio set, storage "A" and "B" batteries, and a charger, of switch means, leads connecting said set, said batteries and said charger to said switch means, a switch member carried by said switch means adapted in one operative position to contact with the set leads and in another operative position to contact with the charger leads, a charger control switch member carried by said switch means adapted in one operative position to contact with the "A" battery leads and in another operative position to contact with the "B" battery leads whereby only one of said batteries may be charged at a time, and electrical connections between said switch members whereby individual connections may be made in various positions of said switch members between said set and "A" battery, said "A" battery and charger, and said "B" battery and charger, an operative connection between said switch members adapted to simultaneously move said switch members to their operative positions in contact with said "A" battery and set leads, and to prevent movement of said first switch member to its position in contact with said set leads in the position of said second switch member in contact with said "B" battery leads.

3. The combination with a radio set, storage "A" and "B" batteries, and a charger, of switch means, leads connecting said set, said batteries and said charger to said switch means, a multi-blade lever switch carried by said switch means adapted in one operative position to contact with said set leads and in another operative position to contact with said charger leads, a charger control multi-blade lever switch carried by said switch means adapted in one operative position to contact with said "A" battery leads and in another operative position to contact with said "B" battery leads whereby only one of said batteries may be charged at a time, and electrical connections between said levers whereby individual connections may be made in various positions of said levers between said set and "A" battery, said "A" battery and charger, and said "B" battery and charger, an arm connected to one of said levers and engaging the other at one side thereof and adapted to simultaneously move said levers to their operative positions in contact with said "A" battery leads and set leads, and to prevent movement of said first lever to its position in contact with said set leads in the position of said second lever in contact with said "B" battery leads.

Signed at Bridgeport, in the county of Fairfield and State of Connecticut, this 26th day of February A. D. 1924.

JOHN F. KEANE.